March 18, 1958  J. H. ROHLFS  2,826,963
MACHINE FOR CUTTING AN ARCUATE FACE
ON A METAL BAR OR THE LIKE
Filed June 13, 1955  3 Sheets-Sheet 1

INVENTOR.
JOHN H. ROHLFS
BY S. Jay Teller
ATTORNEY

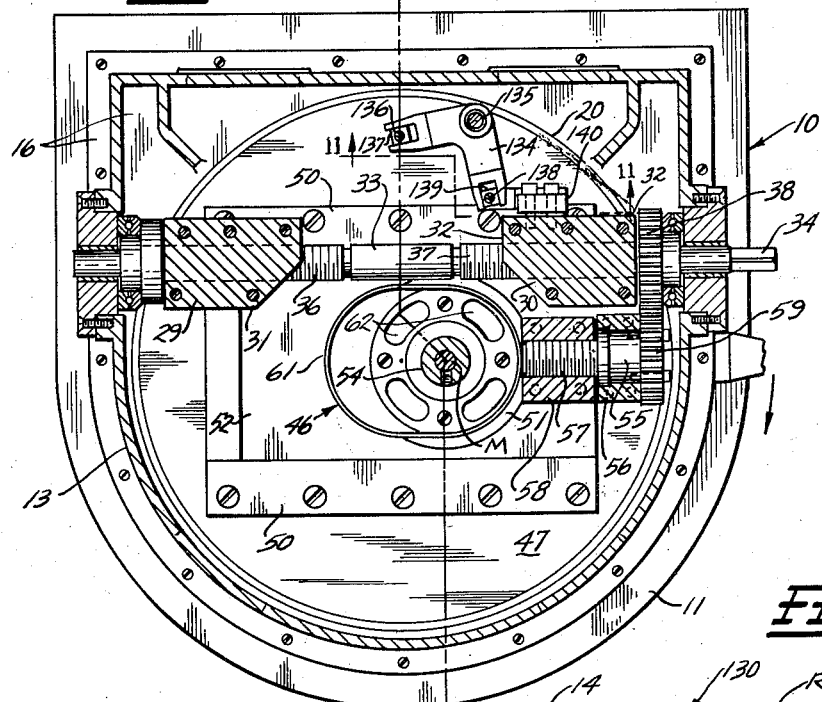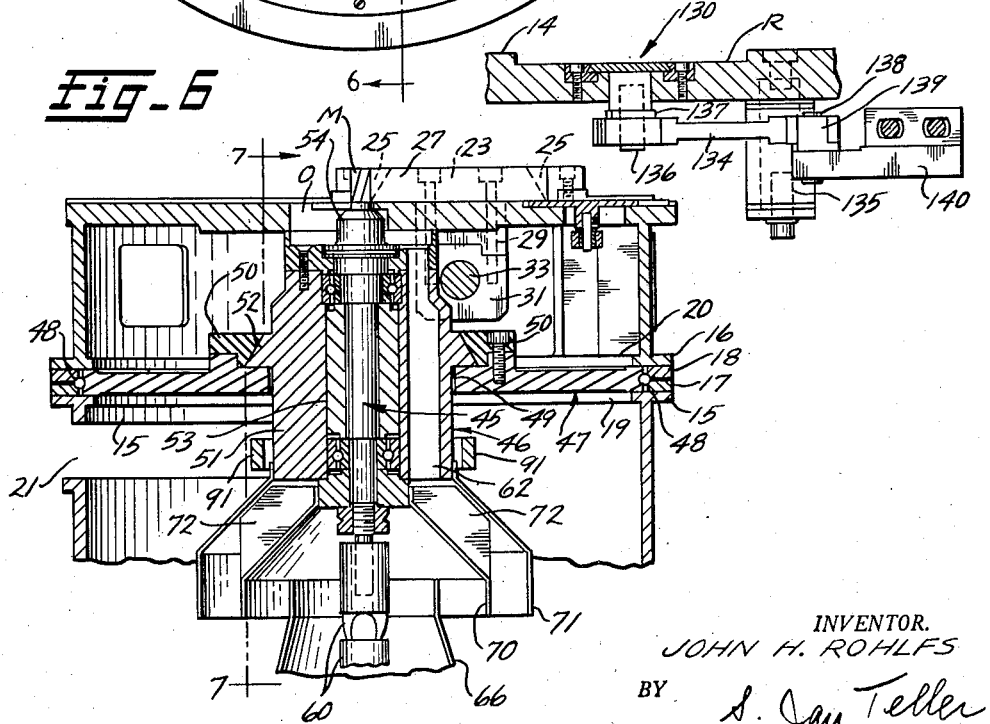

March 18, 1958

J. H. ROHLFS 2,826,963

MACHINE FOR CUTTING AN ARCUATE FACE
ON A METAL BAR OR THE LIKE

Filed June 13, 1955

INVENTOR.
JOHN H. ROHLFS
BY
S. Jay Teller
ATTORNEY

United States Patent Office 2,826,963
Patented Mar. 18, 1958

2,826,963

MACHINE FOR CUTTING AN ARCUATE FACE ON A METAL BAR OR THE LIKE

John H. Rohlfs, Winsted, Conn.

Application June 13, 1955, Serial No. 515,023

15 Claims. (Cl. 90—15)

This invention relates to a machine tool and, more specifically, to a milling machine which is particularly adapted to cut arcuate or rounded faces on metal bars or the like.

In machine shop practice, it is sometimes necessary to provide rounded faces or surfaces on workpieces which cannot conveniently be accommodated for the purpose in conventional metal working machine tools without using especially formed cutting tools. As a result, the mechanic will frequently resort to arduous and time-consuming hand operations to provide the desired surface. For example, in rounding the ends of a shaft key, the mechanic may at first scribe the ends of the rectangular key stock, then he may saw the stock in a band saw along the scribe lines, and then he may grind or file the rough rounded ends before the key is satisfactorily finished. Obviously, such hand performance lacks the precision usually associated with and desired in machine shop practice.

It is the general object of the invention to provide a machine which is particularly adapted to employ a milling cutter to provide rounded faces on the ends of metal bars or the like and which does not require the operator to hold either the workpiece or cutting tool and which will accommodate workpieces of various sizes without requiring a "set up" change for each new size workpiece.

Another object of the invention is to provide a machine of the aforedescribed type having means for gripping and immovably securing the workpiece and means for moving the cutting tool with respect thereto and wherein the work gripping means and the cutting tool support means are operatively associated so as automatically to locate the cutting tool relative to any workpiece engaged by the gripping means.

A more specific object of the invention is to provide in a machine tool of the type described manually operable work locating means and automatically operable work locating means, the latter being operatively associated with the work gripping means and with the cutting tool support means whereby a workpiece may be precisely located in the gripping means with reference to the cutting tool and to the path of movement which the cutting tool will follow.

Other objects and advantages of the invention will become apparent to those skilled in the art from the following description with reference to the accompanying drawings wherein, by way of preferred example only, one embodiment of the invention is shown. It will be understood that it is not the intent to define or limit the scope of the invention to the embodiment of the drawings or to the terms of the description, the claims forming a part of the specification being relied upon to define the invention and to indicate its scope.

Of the drawings,

Fig. 5 is a horizontal cross-sectional view of the machine taken as indicated by the line 5—5 of Fig. 1;

Fig. 6 is a fragmentary vertical cross-sectional view taken as indicated by the line 6—6 of Fig. 5;

Fig. 11 is a detail sectional view taken as indicated by the line 11—11 of Fig. 5 to illustrate details of the automatically operable work locating means.

Figure 1:
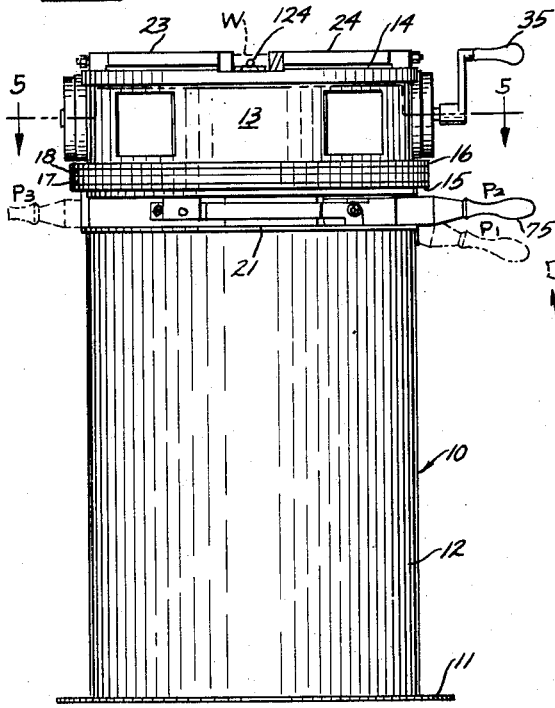
Fig. 1 is a front elevational view of a milling machine incorporating the features of the present invention.

A machine incorporating the features of the present invention may be described very generally as comprising a frame which includes a substantially horizontal table or bed upon which a workpiece may be supported between the jaws of a vise. The machine also includes a substantially vertical spindle capable of securing a milling cutter at its upper end, the spindle being journalled in a housing with its upper end projecting into a suitable opening in the bed for engagement of the cutter with the workpiece. The spindle housing is slidably supported below the bed on a rotatable plate and is connected with means for operating the vise jaws so that the spindle and the cutting tool will be moved toward or away from the workpiece with one of the said jaws. The machine also comprises means for locking the spindle housing in adjusted positions on its support plate and for rotating the support plate whereby the rotating cutter will swing through an arcuate path of movement while in cutting engagement with the workpiece. The machine includes manually operable gauge means for locating a workpiece on the bed so that a minimum amount of stock will be removed therefrom in providing the workpiece with a rounded surface. In addition to the foregoing, the machine includes an automatically positioned gauge for reference in locating one end of a workpiece so that the other end will be rounded at a known distance from the said one end.

*The frame, the vise, and the vise operating means*

In the accompanying drawings, the frame is indicated generally by the reference numeral 10 and in a preferred form comprises two sections, namely, a bottom section and a top section. The bottom section includes a floor base 11 and a substantially vertical shell 12. The top section includes a generally similar shell 13 and a substantially horizontal top wall 14 which provides the table or bed of the machine. The sections of the frame are coupled together by conventional fastening devices at flanges 15 and 16 formed on the shells 12 and 13, respectively. The said flanges are spaced apart by bottom and top bearing races 17 and 18 which surround and journal a substantially horizontal rotatable plate located between the shells as will be described hereinafter. The bottom shell 12 and the top shell 13 each have a rounded front, encompassing an arc of approximately 180°, and each of the shells has flat or straight sides and a flat or straight rear wall which is normal to the sides. The shell flanges 15 and 16 project inwardly as well as outwardly from the front, sides and rear wall of the shells and each defines a large circular opening, the openings being identified by the reference numerals 19 and 20, respectively, (Figs. 5 and 6). Access may be had from the bottom and from the top through the openings 19 and 20, respectively, to the aforesaid rotatable plate which is located between the flanges 15 and 16 and surrounded by the bearing races 17 and 18.

The aforedescribed sections of the frame 10 are preferably cast and in casting the bottom section, a horizontal opening or slot 21 is provided in the shell 12 to extend across the front approximately 180° from one side thereof to the other side adjacent and below the flange 15. A vertical opening 22 is provided in the right-hand side of the shell 12 to communicate with the slot 21. As will be explained in greater detail, an operating handle for the rotatable plate normally is located in the opening 22 and when the plate is to be rotated the said handle is raised into the slot 21 and then moved therein.

The vise utilized to engage and secure a workpiece on the top wall or bed 14 of the frame includes a pair of jaws 23 and 24 which are respectively located on opposite sides of a center line C—C (Figs. 2 and 4) extending from the front to the rear of the said bed. The top portion of each jaw is substantially flat and horizontally disposed for rectilinear reciprocation on the bed 14 normal to the center line C—C. To this end, each jaw has tapered side edges engaged in dove-tail fashion within a pair of gibs which are secured to the bed 14. The gibs for the jaw 23 are indicated at 25, 25 and the gibs for the jaw 24 are indicated at 26, 26. Each of the said jaws also has a face plate which is attached as by studs and bolts to the end of a jaw adjacent and facing the other jaw. The face plate for the jaw 23 is shown at 27 and the face plate for the jaw 24 is shown at 28. The jaws 23 and 24 and their respective face plates 27 and 28 are so arranged that a workpiece W (Fig. 4), in the form of key stock or a metal bar, will be held with its center line on the center line C—C which is in a central vertical plane and with the front end of the workpiece disposed over an opening O in the bed 14 through which the cutter projects to engage the workpiece. It will be observed that the bed is recessed, as indicated at R, adjacent and along the center line C—C and that the workpiece will lie flat and in a horizontal position within the recess for engagement by the jaw face plates 27 and 28.

The jaws 23 and 24 have generally similar depending extensions 29 and 30, respectively, which project through suitable openings in the bed 14 on opposite sides of the center line C—C and which are rigidly connected with jaw carriers 31 and 32, respectively. The said openings in the bed are of sufficient size to permit reciprocation of the jaw extensions so that the jaw plates 27 and 28 can be engaged or substantially engaged on the center line C—C or retracted a substantial distance therefrom. The jaw carriers 31 and 32 form parts of the means for reciprocating the jaws 23 and 24, respectively, the said carriers being provided with threaded bores and engaged upon a threaded shaft or lead screw 33 which extends from side-to-side of the frame 10 in the top shell 13 below the bed 14. It will be observed (Fig. 5) that the shaft 33 is suitably journalled adjacent its ends in the frame and that the right-hand end 34 thereof is adapted to receive a crank handle 35 whereby the said screw shaft or lead screw 33 is manually operable. It will also be observed that the said shaft has two threaded portions or sections 36 and 37 which are respectively engaged by the threaded jaw carriers 31 and 32. It is an important feature of the vise construction that the shaft sections 36 and 37 are threaded of opposite hand whereby rotation of the operating crank 35, and thus the shaft 33, in one direction will cause simultaneous movement of the jaw carriers and the jaws 23 and 24 toward each other and rotation of the crank in the opposite direction will cause simultaneous movement of the jaw carriers and the jaws away from each other.

In accordance with one feature of the present invention, a gear 38 (Fig. 5) is secured to the lead screw 33 adjacent the right-hand journal and provides means for connecting the lead screw and transmitting motion from the lead screw to means for moving the spindle housing, and thus the spindle and cutter, toward or away from the workpiece W as will be more fully described hereinafter.

*The spindle, its housing, and the rotatable support plate for the housing*

The spindle, its housing, and the rotatable support plate therefor are indicated generally by the reference numerals 45, 46 and 47, respectively. As previously mentioned, the support plate 47 is rotatably supported in the bearing rings or races 17 and 18 located between the shell flanges 15 and 16. A plurality of bearing balls 48, 48 are located between the plate 47 and the said races to reduce friction and provide for easy rotation of the plate in a horizontal plane. As will be more fully set forth in describing operation, the plate 47 is rotated through 180° from the position shown in the drawings (clockwise as viewed in Fig. 5) when the workpiece is being cut and then the plate is returned to the rotated position shown. Accordingly, the position of the plate 47 as shown may be referred to as its "normal" position.

Figure 7:
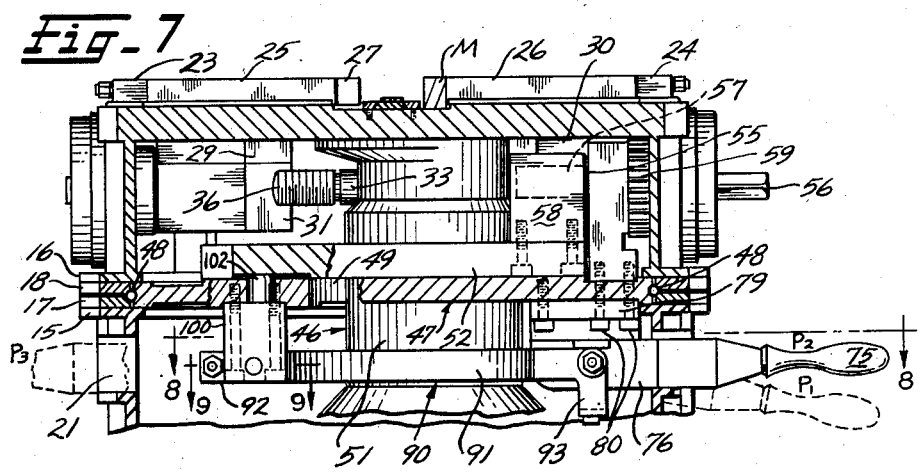
Fig. 7 is another fragmentary vertical cross-sectional view taken as indicated by the line 7—7 of Fig. 6.

The plate 47 has a centrally disposed slot-like opening 49 (Figs. 6 and 7) which, in the normal position of the plate, is disposed with its major dimension normal to the sides of the frame. The spindle housing 46 is located in the opening 49 to project vertically above and below the plate 47. The housing 46 may be reciprocated in the slot-like opening 49 by being slidable along gibs 50, 50 (Fig. 5) which are secured to the top of the plate 47 in parallel relationship to the major dimension of the said opening. More specifically, the housing 46 comprises a generally cylindrical main body portion 51 which projects above and below the support plate 47 and a horizontally disposed plate portion or slide portion 52 which lies on the support plate 47 and has tapered sides for dovetail engagement with the gibs 50, 50. Thus, when the slide plate 52 is reciprocated in the gibs 50, 50, the main or cylindrical body portion 51 of the housing 46 is reciprocated within the slot-like opening 49.

The housing 46 has a central vertical bore 53 wherein the spindle 45 is rotatably supported on suitable bearings so that the axis of the spindle is substantially vertical. The upper end of the spindle 45 projects above its housing 46 and is provided with a collet or chuck 54 adapted to secure a milling cutter M so that the said cutter projects above the opening O in the bed 14 for engagement with the workpiece W on one side of the center line C—C. When the support plate 47 is in its normal rotated position, the cutter M will always be disposed on the right-hand side of the center line C—C. The cutter M can be moved toward or away from the center line when the plate is in its normal position by movement of the housing 46 with respect to the plate in the manner described above.

The means for reciprocating the spindle housing 46 includes a stub shaft 55 which is supported in a bearing block 56 secured to the plate 47 in such position that the said stub shaft will be parallel to the manually operable lead screw 33 in the normal rotated position of the said plate. The stub shaft 55 has a threaded extension 57 which is engaged by a threaded block or nut 58 secured to the slide plate 52 of the spindle housing 46. A gear 59 is secured on the stub shaft 55 to mesh with the lead screw gear 38 in the normal rotated position of the support plate 47.

Accordingly, in the normal position of the support plate 47, the spindle housing 46, and thus the spindle 45 and the cutter M can be moved rectilinearly toward or away from the center line C—C by manual rotation of the lead screw 33 by the crank 35. In this connection, it should be observed that the threads on the stub shaft extension 57 are of opposite hand to the threads on the lead screw section 37 which are engaged by the carrier for the jaw 24. Therefore, the cutter M and the jaw 24 always move in the same direction, the lead screw 33 and the stub shaft 55 being tuned oppositely. It is important to note that the cutter M is located adjacent the front end of the face plate 28 on the jaw 24 in such position that it will engage the surface of a workpiece W when the workpiece is engaged by the said face plate. When the jaw 24 is retracted so that the face plate 28 is withdrawn from engagement with the workpiece, the cutter M is withdrawn a like distance.

Figure 3:
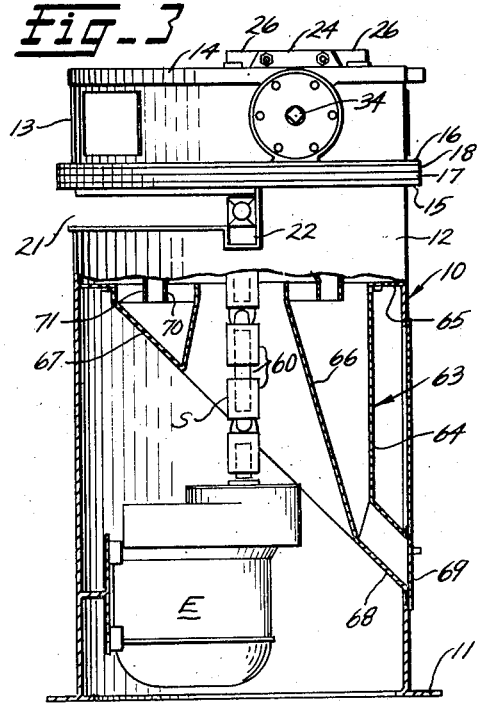
Fig. 3 is a view partially in vertical section and partially in elevation taken from the right-hand side of the machine.

The milling cutter M is rotated by the spindle 45 and cuts a rounded end on the workpiece W when the plate 47 is rotated through 180° (clockwise as viewed in Fig. 5) from its normal position thereby to swing the said cutter and spindle from one side of the center line C—C to the other side thereof, the cutter M traversing a 180° arc within the opening O. The means for rotating or driving the spindle 45 comprises an electric motor E (Fig. 3) rigidly mounted within the lower shell 12 and connected to the bottom end of the spindle by a flexible shaft S. The flexible shaft is made up of a plurality of interconnected pin and socket linkages 60, 60, the uppermost of which is connected to the said spindle. The extended length of the shaft S will vary as the spindle swings through the 180° arc, but the driving connection with the motor E is maintained.

It will be readily understood that metal chips will result from cutting the workpiece W with the milling cutter M. The chips are removed from the machine bed by falling and being drawn through the opening O into a scoop 61 formed in the upper end of the spindle housing 46 to cover the bottom of the opening O in any rotated or rectilinearly adjusted position of the said housing. The chips then pass from the scoop 61 through a plurality of vertical passages 62, 62 in the spindle housing into chip collecting means 63 within the lower shell 12. The chip collecting means includes an outer, relatively thin, sheet metal shell 64 secured in a substantially vertical position on an appropriate inwardly extending flange 65 on the lower shell 12 of the machine frame 10 and the chip collecting means also includes an inner sheet metal shell 66. The shells 64 and 66 are connected together by an annular bottom wall 67 which slopes downwardly from the front of the machine frame toward the rear thereof. A chip removal chute 68 extends from the outer chip collecting shell 64 to the rear wall of the lower shell 12 of the frame 10, a detachable plate 69 being located on said rear wall so that the chips can be taken from the chute 68 when desired. The means for admitting the chips between the inner and outer chip collecting shells 66 and 64 comprises a generally annular inner sheet metal skirt 70 and an outer sheet metal skirt 71 which are connected with the bottom of the housing 46 on the radially inner and outer sides of the passages 62, 62. The means drawing the chips downwardly in the passages 62, 62 comprise a plurality of vanes 72, 72 secured for rotation with inner skirt 70 and extending toward the outer skirt 71. The vanes 72, 72 are pitched to draw the chips through the passages 62, 62 and to blow them downwardly.

*The means for locking the spindle housing in adjusted position and for rotating the support plate*

Figure 8:
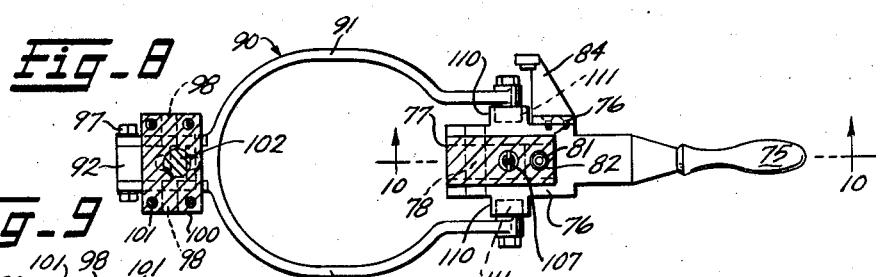
Fig. 8 is a detail plan view of the operating handle and the spindle housing locking lever with parts shown in section as taken on the line 8—8 of Fig. 7.
Figure 9:
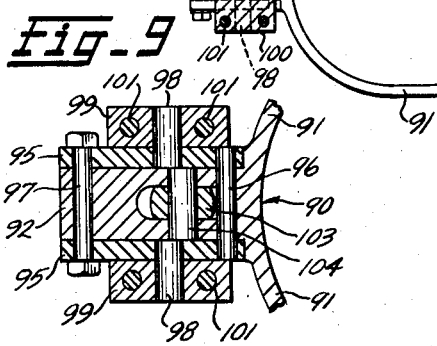
Fig. 9 is an enlarged horizontal cross-sectional view taken as indicated by the line 9—9 of Fig. 7 to illustrate details of the spindle housing locking mechanism.

As hereinbefore mentioned, the horizontal slot 21 and the vertical opening or slot 22 in the shell 12 are provided to accommodate a handle which is used to swing the support plate through 180°. The handle is identified by the numeral 75 in Figs. 7, 8 and 10 which show its construction and function to best advantage. As shown in said views, the handle 75 has a hand grip formed on its outer end and it has a bifurcated inner end defining the arms 76, 76 which engage the sides of a block 77 and which are pivoted thereto by a substantially horizontally disposed pin 78. The block 77 is generally rectangular and has an upper flange 79 on each side, the flanges 79, 79 engaging the bottom surface of the support plate 47 and being secured thereto as by screws 80, 80. The handle 75 can be pivoted in a vertical plane between the positions $P_1$ and $P_2$ only when the handle projects through the vertical slot 22 in the lower shell 12. When the handle 75 does project through the slot 22, the support plate 47 is in its aforedescribed normal position. The handle 75 is biased toward the lower position $P_1$ by a spring 81 which is disposed within a substantially vertical bore 82 in the block 77 to exert force between the plate 47 and a portion 83 of the handle 75 which portion extends between the arms 76, 76 and underlies a portion of the block 77. As will be more fully set forth hereinafter, the spindle housing 46 is unlocked and the spindle drive motor E is "off" when the handle is in the lower position $P_1$. When the handle is pivoted to the upper position $P_2$, the housing 46 is locked in position on the plate 47 and the motor E is "on" to drive the cutter M. Also in the upper pivoted position $P_2$, the handle 75 is in position for movement into the horizontal slot 21. Therefore, in operation, the handle 75 is manually lifted from the position $P_1$ to the position $P_2$ and then, by manually swinging the handle in the slot 21 to the position $P_3$, the plate 47 and the spindle housing 46 will be rotated 180° and the milling cutter M will traverse a 180° arc and round the forwardly projecting end of the workpiece W. Having completed the cut, the handle is manually returned from the position $P_3$ to the position $P_2$ and, when released, the spring 81 will bias the handle into the position $P_1$. It will be readily understood that in rotating the plate 47 through 180°, corresponding to handle movement from the position $P_2$ to the position $P_3$, the gear 59 will be disengaged from the gear 38 and will be re-engaged therewith only when the handle 75 is returned to the position $P_2$.

The means associated with the handle 75 for energizing and de-energizing the motor E comprises a trip 84 (Fig. 8) engageable with a suitable switch (not shown) in the power circuit to the said motor. In accordance with conventional technique, the trip and switch are so arranged as to energize the motor E when the handle is pivoted upwardly to the position $P_2$ and to de-energize the motor when the handle is pivoted downwardly to the position $P_1$. Therefore, the milling cutter M will not be rotated when the handle 75 is in the position $P_1$. It is only in this position of the handle that the crank 35 is rotated to open and to close the vise and to effect a rectilinear adjustment of the spindle housing 46 along the plate 47. As previously mentioned, when the handle 75 is pivoted upwardly to the position $P_2$, the spindle housing 46 is locked in adjusted rectilinear position on the plate 47.

The means for locking the spindle housing includes a yoke-like lever 90 having two integrally formed legs 91, 91 which surround the body portion 51 of the spindle housing 46 below the support plate 47. At one end, the legs 91, 91 are joined together and a generally rectangular extension 92 of the lever 90 is formed on said one end for pivotally supporting the said lever. At the other end, the legs 91, 91 have downwardly projecting extensions 93, 93 which are connected at their bottom ends by a cross piece or bar 94. The said "other" end of the lever is associated with the operating handle 75 in a manner which will be described.

The rectangular extension 92 of the locking lever 90 is engaged at its sides by a pair of spacer plates 95, 95, the said plates being pinned to the extension as indicated at 96 and being bolted thereto as indicated at 97. The spacer plates 95, 95, and thus the locking lever 90, are pivotally supported on aligned pins 98, 98 which extend from the plates into the legs 99, 99 of a bifurcated block 100 which is secured in depending relationship as by screws 101, 101 to the support plate 47. Therefore, it can be said that the locking lever 90 is pivotally supported from the plate 47, the pivotal axis being horizontal and on the center line of the pins 98, 98.

A locking pin 102 is substantially vertically disposed in a suitable opening in the support plate 47 and projects upwardly therefrom for engagement with the bottom surface of the slide plate 52 which comprises a part of the spindle housing. The locking pin 102 projects downwardly through a suitable opening in the pivot block 100 and has a flattened lower end portion 103 which is engaged by a cross pin 104 in the locking lever extension 92. It will be observed that the locking pin 102 is thus supported for movement by the locking lever 90 along a substantially vertical axis which is spaced only a short distance from the substantially horizontal pivotal axis of the said lever. Accordingly, a relatively slight force applied to the said "other" end of the locking lever 90 tending to pivot the lever will apply a relatively great force along the axis of the locking pin 102. This is an important aspect of the construction of the locking means. More specifically, the locking pin 102 in the unlocked position of the lever 90 will engage or substantially engage the housing slide plate 52 but no appreciable force will be applied thereto and the housing and slide plate can be adjusted on the plate 47. However, when a relatively slight force is applied to the "other" end of the lever 90 tending to move the same upwardly, it will cause slight upward movement of the locking pin 102 and will also apply great force through the locking pin to the bottom of the slide plate. This great force on the slide plate 52 causes the same to be frictionally locked in adjusted position on the support plate 47. Since the spindle housing should be locked only when the operating handle 75 is elevated, attention is now directed to the "other" end of the locking lever and to its association with the said operating handle.

Figure 10:
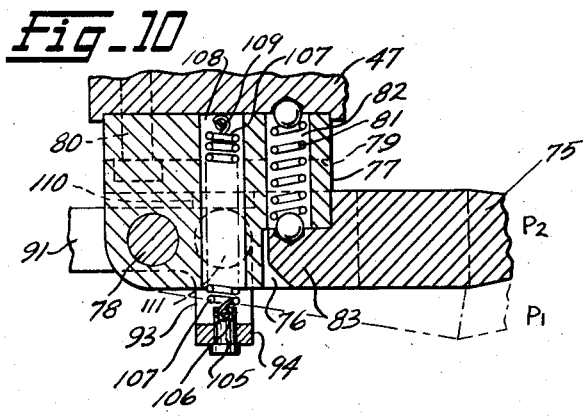
Fig. 10 is an enlarged vertical cross-sectional view taken as indicated by the line 10—10 of Fig. 8 to illustrate details of the operating arm and of the spindle housing locking lever.

As mentioned before, the ends of the lever legs 91, 91 have generally vertically depending extensions 93, 93 which are connected at their bottom ends by the cross bar 94. The cross bar 94 is located below the inner end of the handle 75 and its support block 77. A hollow pin 105 is supported in the cross piece 94 at about its midpoint and the said hollow pin has a cross pin 106 to which is fastened the bottom end of a tension spring 107. The upper end of the spring 107 is disposed in a substantially vertical opening 108 in the block 77 and is attached to a cross pin 109 therein. By means of the spring 107, the locking lever 90 is biased upwardly with sufficient force to cause locking engagement of the locking pin 102 with the spindle housing slide plate 52. The lever 90 is moved downwardly to unlock the spindle housing only when the operating handle 75 is disposed within the vertical slot 22 so that it can move from the elevated $P_2$ position into the lower or $P_1$ position. More specifically, each arm 76 of the operating handle 75 has a laterally projecting ear 110, the ears 110, 110 resting upon rollers 111, 111 rotatably supported adjacent the inside surfaces of the legs 91, 91 of the lever 90 at the point where the said legs extend downwardly. As best seen in Fig. 10, the spring 81 exerts a downward force on the operating handle 75 on a moment arm from the axis of rotation of the said operating handle at the pin 78. This downward force applied to the operating handle 75 is applied to the operating lever 90 through the ears 110, 110 on a moment arm from the axis of the pin 78 to the axis of the rollers 111, 111. This last mentioned moment arm is substantially less than the first mentioned moment arm and thus it will be seen that a spring 81 exerting equal or even less force than the spring 107 will cause the locking lever 90 to be depressed because of the difference in the moment arms. Thus, when the operating handle 75 is positioned in the vertical slot 22 so that it can be moved from its $P_2$ to $P_1$ position, it will automatically be moved by the compression spring 81, and the locking lever 90 will automatically be shifted to the non-locking position. When the operating handle 75 is disposed in the horizontal slot 21 so that it cannot move downwardly, the locking lever will automatically be locked.

Thus, the locking lever 90 is automatically operated to lock and to unlock the spindle housing 46. When the operating handle 75 is elevated, the spring 107 elevates the locking lever to lock the spindle housing. When the handle 75 is depressed, it thrusts the locking lever 90 downwardly to unlock the spindle housing. When the spindle housing is automatically locked in position on the support plate 47, the stub shaft 55 cannot be rotated and the gear 59 cannot be rotated. Thus, when the support plate is rotated 180° whereby the gears 59 and 38 are disengaged, the gear 59 will be held in position for precise reengagement with the gear 38 upon returning the support plate to its normal position.

*The gauges for locating the workpiece*

Figure 2:
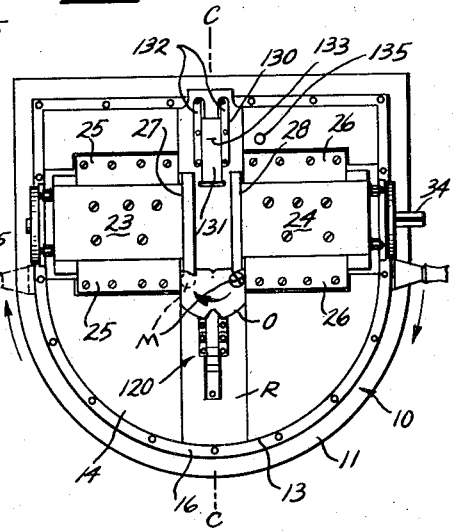
Fig. 2 is a top plan view of the milling machine.
Figure 4:
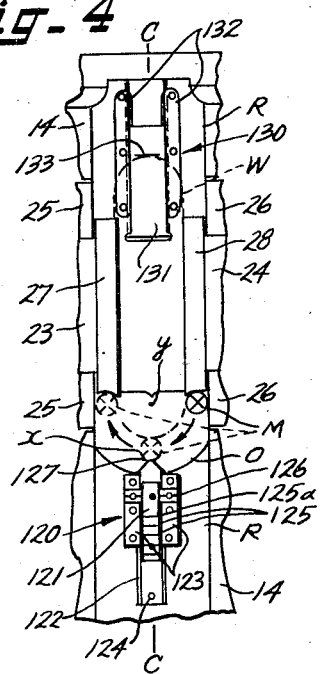
Fig. 4 is an enlarged fragmentary plan view of the milling machine.

The manually operable gauge means for locating the end of a workpiece W for cutting is indicated generally by the reference numeral 120 in Figs. 2 and 4. The gauge means 120 includes a calibrated scale 121 which is secured to a slide 122 movable in gibs 123, 123, the gibs being secured to the machine bed 14 in the recess R forwardly of the vise in such position that the slide and scale will move along the center line C—C. The slide 123 has a pin 124 extending upwardly therefrom so that an operator can move the said slide in the gibs 123, 123. The scale 121 has a plurality of transverse markings or lines 125, 125 which correspond to stock width. That is, for a workpiece W which may be 2 inches wide, reference will be had to one of the transverse scale lines, for example, the line 125a which may be indicated by the legend "Two Inches." The operator will align the line 125a with a reference line 126 on the gibs 123, 123. In such position of the scale, the rear end 127 of the slide 122 will be positioned for engagement with the 2 inch wide workpiece W. That is, when the workpiece W is positioned in engagement with the rear end of the slide 122 and then engaged and secured by the vise, the operator will know that the forward end of the workpiece will be positioned at substantially 1 inch from the swing center of the cutter M and said end will be rounded off without excessive waste of metal. This knowledge is certain from the fact that the cutter M is moved with the vise jaw 24 and will swing on a 1 inch radius about a center Y (Fig. 4) when the vise grips a 2 inch wide workpiece. If the workpiece W is only 1 inch wide, the "One Inch" reference line 125 on the scale will be aligned with the reference mark 126 and the rear end of the slide will position the end of the workpiece at substantially ½ inch from the swing center Y for the cutter M which center Y lies on the center line C—C.

The automatically operable gauge means is indicated generally by the reference numeral 130 and is employed to locate the rear end of a workpiece. The details of the gauge means 130 are shown in Figs. 2, 4, 5 and 11 and the said gauge means 130 includes a slide 131 movable along gibs 132, 132 secured in the bed recess R rearwardly of the vise so that the slide will be disposed on the center line C—C. The slide 131 has at least one reference line 133 for locating a workpiece W. That is, the rear end of the workpiece being located is positioned with reference to the line 133. It is the purpose of the gauge 130 to select the finished length of a workpiece without reference to its width. More particularly, the line 133 may be a 10 inch reference line. That is, when a workpiece W is secured in the vise with its rear end on the line 133, its front end will be rounded by the cutter M at 10 inches from the said rear end. Therefore, it will be understood that the slide 131 must move with the vise jaw 124 in order that the line 133 will always be disposed 10 inches from the farthest point in the 180° swing of the cutter.

The means moving the slide 131 with the jaw 124 includes a bell crank 134 pivotally supported on a pin 135 below the bed 14. One end of the bell crank 134 is pivotally and slidably connected with the slide by means of a pin 136 and sliding block 137 and the other end thereof is connected by a pin 138 and sliding block 139 to a bracket 140 rigidly secured to the jaw extension 30. As the jaw 24 is moved rectilinearly toward or away from the center line C—C, the bell crank 134 will cause the slide 131 to respectively move away or toward the swing axis of the cutter M. Thus, in movement of the jaw toward the center line C—C which is accompanied by movement of the spindle housing and cutter, the swing radius of the cutter is reduced and the slide is moved rearward to maintain a 10 inch distance between the reference line and the farthest position of the cutter M during its 180° swing. This farthest position of the cutter is indicated in Fig. 4 by the reference X.

The operation

It is believed that the understanding of the invention will be enhanced if the operation of the machine is described with reference to a specific problem wherein a piece of rectangular key stock 10 1/16 inches long and 2 inches wide is to be provided with rounded ends at a finished length of 10 inches.

The operator will at first assure himself that the operating handle 75 is in its lowermost position within the slot 22, whereby the drive motor E will be de-energized and the spindle housing 46 will be unlocked and capable of rectilinear adjustment on the support plate 47. Then, the operator will adjust the slide 122 in the manually operable gauge means 120 to such position that the "Two Inch" reference line 125a is aligned with the reference line or lines 126. The workpiece can then be placed on the bed 14 within the recess R with its front end in engagement with the rear end of the slide 122. Then, the operator will apply force to the crank 135 rotating the lead screw 33 to advance the vise jaws 23 and 24 toward engagement with the sides of the workpiece W. When advancing the jaws 23 and 24 toward the workpiece, the spindle housing 46 will be moved rectilinearly along the support plate 47 by the stub shaft 55 which is connected with the lead screw 33 by means of gears 38 and 59. Such rectilinear adjustment of the spindle housing will keep the cutter M in motion with the jaw plate 28 of the vise jaw 24 so that the said cutter will engage the side of the workpiece W simultaneously with the jaw plate 28. Having engaged and firmly secured the workpiece W with the jaw plates 27 and 28, the operator should then retract or move forwardly the slide 122 to such a position that it cannot be engaged by the cutter M during its cutting swing through the 180° arc.

The next step of the operation is to elevate or pivot upwardly the operating handle 75 which will automatically energize the spindle drive motor E whereby cutter rotation will commence. In shifting the handle 75 to its upper position $P_2$, the locking lever 99 is released by the said operating handle so that the locking spring 107 will pivot the said lever upwardly thereby applying locking force to the pin 102 in engagement with the spindle housing slide plate 52. This will lock the spindle housing in adjusted rectilinear position on the support plate 47. Then, the operator can swing the handle 75 in the horizontal slot 21 from the position $P_2$ to the position $P_3$. In swinging the handle 75, the support plate 47, the spindle housing 46, the spindle 45 and the milling cutter M are rotated through 180° whereby the cutter M cuts a rounded surface on the front end of the workpiece about the center Y. Having completed the cutting operation, the operator moves the handle 75 from the position $P_3$ to the position $P_2$ in the slot 21. In moving back to the position $P_2$, the gear 59 will engage the gear 38 in the same series of teeth of the previous engagement. Then, the operator can release the handle 75 and it will be biased by its spring 81 downwardly in the slot 22 to de-energize the spindle drive motor E. When the handle 75 is returned to its lower or $P_1$ position, the ears 110, 110 force the locking lever 90 downwardly thereby releasing the locking pressure on the pin 102. Then, the crank 35 can be turned to retract the vise jaws 23 and 24 and to remove the milling cutter M from engagement with the workpiece W.

Then, the operator will reverse the workpiece W on the bed 14 placing the rounded end of the workpiece on the reference line 133 of the rear gauge slide 131. Then, the operator can again operate the crank 35 to engage the jaws 23 and 24 with the sides of the workpiece, but in bringing the said jaws into engagement with the workpiece, he should move the workpiece W with the slide 131 so that the rounded end of the workpiece will be disposed on the reference line 133 when the workpiece is engaged and secured by the jaw plates 27 and 28. As previously set forth, this locates the rounded rear end of the workpiece at 10 inches along the center line C—C from the cutter M as it swings through its cutting arc. Once again the operator will move the handle 75 from the position $P_1$ to the position $P_2$ and then to the position $P_3$, the next movement rounding the forwardly projecting end of the workpiece. After the operating handle 75 is returned from the position $P_3$ to the position $P_2$ and then to the position $P_1$, the crank 35 can be manipulated to disengage the jaws and the workpiece W will have been provided with rounded ends and will have an overall length of 10 inches.

The invention claimed is:

1. A machine for cutting an arcuate face on a metal bar or other workpiece and comprising a frame, a vise supported on the frame and including a pair of jaws adapted to support a workpiece therebetween, means for moving at least one of said jaws either toward or away from the other, rotatable support means, a rotatable spindle adapted to secure a cutting tool for engagement with a workpiece supported by the jaws, a housing journalling said spindle and slidably supported on said support means, the said housing being connected with the jaw moving means in one rotated position of the support means for movement of the housing with the said one jaw whereby the spindle and the cutting tool are movable either toward or away from the workpiece, and means for rotating said support means to disconnect the housing and the jaw moving means and to swing the spindle and the cutting tool in an arc while the cutting tool engages the workpiece.

2. A machine for cutting an arcuate face on a metal bar or other workpiece and comprising a frame, a vise supported on the frame and including a pair of jaws adapted to support a workpiece on a center line between the jaws, means for simultaneously moving the said jaws either toward or away from the center line, a plate rotatably supported by the frame, a rotatable spindle having one end adapted to secure a cutting tool for engagement with a workpiece supported by the jaws, a housing journalling said spindle and slidably supported on said plate, the said housing being connected with the jaw moving means in one rotated position of the plate for movement of the housing with one of said jaws whereby the spindle and the cutting tool are movable either toward or away from said center line, and means for rotating said plate to disconnect the housing and the jaw moving means and to swing the spindle and cutting tool from one side to the other side of the center line.

3. A milling machine for cutting an arcuate face on a metal bar or other workpiece and comprising a frame which includes a substantially flat bed, a vise supported on the frame and which includes a pair of jaws adapted to support a workpiece on the bed, means for moving at least one of said jaws along the bed either toward or away from the other of said jaws, a plate rotatably supported by the said frame in a plane below but substantialy parallel to the said bed, a rotatable spindle having its top end adapted to secure a milling cutter, a housing slidably supported on said plate and journalling said spindle with the spindle axis substantially normal to the plate and with the said top end of the spindle projecting toward the bed for engagement of the milling cutter with a workpiece supported in the vise, the said housing being connected with the jaw moving means in one rotated position of the plate for movement of the housing with the said one jaw whereby the spindle and the cutter are movable either toward or away from the workpiece, and means for rotating the plate to disconnect the housing and the jaw moving means and to swing the spindle and the cutter in an arc while the cutter engages the workpiece.

4. A milling machine for providing an arcuate face on the end of a metal bar and comprising a frame which includes a substantially horizontal bed having a generally centrally located opening, a vise supported on the bed and including a pair of jaws movable along the bed and adapted to support the bar on the bed over a center line extending into the said opening and with one end of the bar exposed over the said opening, a manually operable lead screw rotatably supported by the frame in a substantially horizontal position below the said bed with its axis substantially normal to the center line, the said lead screw being connected with the jaws to simultaneously move the same either toward or away from the center line, a first gear connected to the lead screw for rotation therewith, a substantially horizontal plate rotatably supported by the frame below the said bed, a substantially vertical rotatable spindle having its upper end adapted to secure a milling cutter in the bed opening for engagement with the bar, a housing slidably supported on said plate and journalling said spindle, a threaded shaft rotatably supported by the said plate and connected with the housing to slide the same along the plate during rotation of the shaft, a second gear secured to the shaft for engagement with the first gear in one rotated position of the plate whereby the spindle housing, and thus the milling cutter, will be moved either toward or away from the bar with the vise jaws, and manually operable means for rotating the plate from the said one rotated position and thereby to swing the spindle and cutter in an arc with the cutter in engagement with the bar.

5. A milling machine for providing an arcuate face on the end of a metal bar and comprising a frame which includes a substantially horizontal bed having a generally centrally located opening, a vise supported on the bed and including a pair of jaws movable along the bed and adapted to support the bar on the bed over a center line extending into the said opening and with one end of the bar exposed over the said opening, a manually operable lead screw journalled by the frame in a substantially horizontal position below the said bed with it axis substantially normal to the center line, the said lead screw being connected with the jaws to simultaneously move the same either toward or away from the center line, a first gear connected to the lead screw for rotation therewith, a substantially horizontal plate rotatably supported by the frame below said bed, a substantially vertical rotatable spindle having its upper end adapted to secure a milling cutter in the bed opening for engagement with the bar, a housing slidably supported on said plate and journalling said spindle, a threaded shaft rotatably supported on the said plate and connected with the housing to slide the same along the plate during rotation of the shaft, a second gear secured to the shaft for engagement with the first gear in one rotated position of the plate whereby the spindle housing, and thus the milling cutter, will be moved either toward or away from the bar with the vise jaws, manually operable means for rotating the plate from the said one rotated position and thereby to swing the spindle and cutter in an arc with the cutter in engagement with the bar, and automatically operable means for locking the spindle housing in adjusted position on said plate during rotation thereof.

6. A milling machine for providing an arcuate face on the end of a metal bar and comprising a frame which includes a substantially horizontal bed having a generally centrally located opening, a vise supported on the bed and including a pair of jaws movable along the bed and adapted to support the bar on the bed over a center line extending into the said opening and with one end of the bar exposed over the said opening, a manually operable lead screw journalled by the frame in a substantially horizontal position below the said bed with its axis substantially normal to the center line, the said lead screw being connected with the jaws to simultaneously move the same either toward or away from the center line, a first gear connected to the lead screw for rotation therewith, a substantially horizontal plate rotatably supported by the frame below said bed, a substantially vertical rotatable spindle having its upper end adapted to secure a milling cutter in the bed opening for engagement with the bar, a housing slidably supported on said plate and journalling said spindle, a threaded shaft rotatably supported on the said plate and connected with the housing to slide the same along the plate during rotation of the shaft, a second gear secured to the shaft for engagement with the first gear in one rotated position of the plate whereby the spindle housing, and thus the milling cutter, will be moved either toward or away from the bar with the vise jaws, manually operable means for rotating the plate from the said one rotated position and thereby to swing the spindle and cutter in an arc with the cutter in engagement with the bar, and automatically operable means engageable with the spindle housing to lock the same in adjusted position on the plate and thereby to retain the shaft and said second gear in one rotated position while said plate is rotated.

7. A machine for cutting an arcuate face on a metal bar and comprising in combination, a pair of jaws for engaging and holding a bar to be cut, means for simultaneously moving the pair of jaws either toward or away from a central plane between the jaws, a support rotatable about an axis in said plane, a spindle housing movable on said support either toward or away from said axis, means for moving the housing on the support, a rotatable spindle supported by said housing and adapted to secure a milling cutter for cutting engagement with a bar held by the jaws, means for moving said support and thus the housing and spindle about said axis to enable the cutter to cut an arcuate face on the bar, and means connectible with the jaw moving means and the housing moving means for operating them simultaneously so that said housing and each jaw are all moved to the same extent.

8. A milling machine for providing an arcuate face on a metal bar and comprising in combination, a frame, work holding means mounted on the frame and including a pair of jaws for engaging and holding a bar to be cut and wherein at least one of the jaws is movable either toward or away from a central plane between the jaws, means for moving said one jaw, a support rotatable about an axis in said plane, a spindle housing movable on said support either toward or away from the said axis, means for moving the housing on the support, a rotatable spindle supported by the housing and adapted to secure a milling cutter for cutting engagement with a bar held by the jaws, means for rotating the support and the housing and spindle about said axis to enable the cutter to cut an arcuate face on the bar, and means connectible with the jaw moving means and the housing moving means in one rotated position of the support to operate both of said moving means simultaneously.

9. A milling machine for providing an arcuate face on an end of a metal bar and comprising a frame, work holding means mounted on the frame and including at least one movable jaw and a lead screw therefor, a rotatable spindle adapted to secure a milling cutter for engagement with a bar secured in the work holding means, a rotatable support plate mounted on the frame, a spindle housing adjustably supported on the said plate for moving the cutter either toward or away from engagement with the bar, means for adjustably positioning the housing including a shaft rotatably supported by the plate and in threaded connection with the housing, a pair of gears respectively secured to the lead screw and to the shaft for engagement in one rotated position of the plate whereby the spindle housing is movable with said one jaw, means for rotating the plate from said one rotated position thereby to swing the cutter through an arc while in engagement with the bar, and means for locking the housing in adjusted position on the plate, the said locking means comprising a lever pivotally mounted on the plate, and a locking pin connected with the said lever and engageable with said housing in one pivoted position of the lever.

10. A milling machine for providing an arcuate face on an end of a metal bar and comprising a frame, work holding means mounted on the frame and including at least one movable jaw and a lead screw therefor, a rotatable spindle adapted to secure a milling cutter for engagement with a bar secured in the work holding means, a rotatable support plate mounted on the frame, a spindle housing adjustably supported on said plate for moving the cutter either toward or away from engagement with the bar, means for adjustably positioning the housing including a shaft rotatably supported by the plate and in threaded connection with the housing, a pair of gears respectively secured to the lead screw and to the shaft for engagement in one rotated position of the plate whereby the spindle housing is movable with the said one jaw, means for rotating the plate from said one rotated position thereby to swing the cutter through an arc while in engagement with the bar, and means for locking the housing in adjusted position on the plate, the said locking means comprising a lever pivotally mounted on the plate, a locking pin connected with the said lever and engageable with said housing in one pivoted position of the lever, the said lever being operatively associated with the plate rotating means and movable thereby from said one pivoted position, and means biasing said lever into said one pivoted position.

11. A milling machine for providing an arcuate face on an end of a metal bar and comprising a frame, work holding means mounted on the frame and including at least one movable jaw and a lead screw therefor, a rotatable spindle adapted to secure a milling cutter for engagement with a bar secured in the work holding means, a rotatable support plate mounted on the frame, a spindle housing adjustably supported on said plate for moving the cutter either toward or away from engagement with the bar, means for adjustably positioning the housing including a shaft rotatably supported by the plate and in threaded connection with the housing, a pair of gears respectively secured to the lead screw and to the shaft for engagement in one rotated position of the plate whereby the spindle housing is movable with the said one jaw, a handle pivotally connected to said plate for movement between a first and a second pivoted position, the said handle being manually operable in the second pivoted position to rotate the said plate thereby to swing the cutter through an arc while in engagement with the bar, means for locking the housing in adjusted position on the plate and comprising a lever pivotally mounted on the plate, a locking pin connected with the said lever for locking engagement with the said housing in one pivoted position of the lever, and means biasing the said lever into said one pivoted position, the said lever being engageable by the said operating handle for movement thereby from the said one pivoted position when said operating handle is shifted from its second pivoted position to its first pivoted position.

12. A milling machine for providing an arcuate face on an end of a metal bar and comprising a frame, work holding means mounted on the frame and including at least one movable jaw and a lead screw therefor, a rotatable spindle adapted to secure a milling cutter for engagement with a bar secured in the work holding means, a substantially horizontal plate rotatably supported on the frame, a spindle housing having a body portion extending above and below the said plate and journalling the said spindle and the said housing also having a substantially horizontal slide portion slidably engaging the plate for rectilinear adjustment of the housing on the plate whereby the cutter may be moved either toward or away from engagement with the bar, means for adjusting the position of the housing including a shaft rotatably supported on the plate and in threaded conection with the housing, a pair of gears respectively secured to the lead screw and to the shaft for engagement in one rotated position of the plate whereby the spindle housing is adjustable with the said one jaw, a handle pivotally connected with the bottom of said plate for movement between a first and a second pivoted position, the said handle being manually operable in its second pivoted position to rotate the said plate thereby to swing the cutter through an arc while in engagement with the bar, means for locking the housing in adjusted position on the plate and comprising a lever having one end pivotally connected with the bottom of the plate and having two legs extending on opposite sides of the body portion of the housing and operatively associated at the other end of the lever with the said handle, a locking pin connected with the said lever adjacent the said one end thereof and extending through the said plate for engagement with the slide portion of the housing, the said pin effecting locking engagement with the housing in one pivoted position of the lever, and spring means engaging the said other end of the lever and biasing the lever into the said one pivoted position, the said other end of the lever being engageable by the handle for movement thereby from the said one pivoted position when the said handle is shifted from its second pivoted position to its first pivoted position.

13. A milling machine for providing an arcuate face on a metal bar and comprising a frame, work holding means mounted on the frame and including at least one jaw adjustable either toward or away from a center line over which a bar may be secured by the work holding means with a portion of its length exposed, a rotatable spindle adapted to secure a milling cutter for engagement with the exposed portion of the bar, a spindle housing, rotatable support means adjustably securing the spindle housing and mounted on said frame for rotation about an axis intersecting the center line, means operatively interconnecting the spindle housing and the said jaw whereby the cutter may be simultaneously moved with the said one jaw either into or out of engagement with the bar, means for rotating the support means and thereby to swing the spindle and cutter through an arc with the cutter in engagement with the bar, a bar locating gauge including a slide supported on the frame for movement along the center line, and motion transmitting means connected between the said one jaw and the slide and adapted to move the slide toward the said axis responsive to movement of the jaw away from the center line and to move the slide away from the said axis responsive to movement of the jaw toward the center line.

14. A milling machine for providing an arcuate face on a metal bar and comprising a frame having a substantially horizontal bed, work holding means mounted on the frame and including at least one jaw adjustable on the bed either toward or away from a center line on the bed over which a bar may be secured by the work holding means with a portion of its length exposed, a substantially vertical spindle adapted to secure a milling cutter for engagement with the exposed portion of the bar, a spindle housing, rotatable support means adjustably securing the spindle housing and mounted on said frame for rotation about a substantially vertical axis intersecting the center line, means operatively interconnecting the spindle housing and the side one jaw whereby the cutter may be moved with said one jaw either into or out of engagement with the bar, means for rotating the support means and thereby to swing the spindle and cutter through an arc around said axis with the cutter in engagement with bar, a bar locating gauge including a slide supported on the bed for movement along the center line, and motion transmitting means connected between the said one jaw and the slide and adapted to move the slide toward the said axis when the jaw moves away from the center line and to move the slide away from the axis when the jaw moves toward the center line.

15. A milling machine for providing an arcuate face on a metal bar and comprising a frame having a substantially horizontal bed, work holding means mounted on the frame and including at least one jaw adjustable on the bed either toward or away from a center line on the bed over which a bar may be secured by the work holding means with a portion of its length exposed, a substantially vertical spindle adapted to secure a milling cutter for engagement with the exposed portion of the bar, a spindle housing, rotatable support means adjustably securing the spindle housing and mounted on said frame for rotation about a substantially vertical axis intersecting the center line, means operatively interconnecting the spindle housing and the said one jaw whereby the cutter may be moved with the said one jaw either into or out of engagement with the bar, means for rotating the support means and thereby to swing the spindle and cutter through an arc around said axis with the cutter in engagement with the bar, a bar locating gauge including a slide supported on the bed for movement along the center line, and a bell crank having one end pivotally and slidably connected with the said one jaw and its other end pivotally and slidably connected with the said slide, the said bell crank being pivotally supported on the said bed and constructed arranged to move the slide toward the said axis when the jaw moves away from the center line and to move the said slide away from the said axis when the jaw moves toward the center line.

References Cited in the file of this patent

UNITED STATES PATENTS

| | | |
|---|---|---|
| 1,536,691 | Russ | May 5, 1925 |
| 2,146,458 | Willard | Feb. 7, 1939 |
| 2,605,677 | Armitage | Aug. 5, 1952 |